United States Patent
Yamamoto

(10) Patent No.: US 11,987,271 B2
(45) Date of Patent: May 21, 2024

(54) INFORMATION PROCESSING APPARATUS, INFORMATION PROCESSING METHOD, MOBILE-OBJECT CONTROL APPARATUS, AND MOBILE OBJECT

(71) Applicant: SONY SEMICONDUCTOR SOLUTIONS CORPORATION, Kanagawa (JP)

(72) Inventor: Hideaki Yamamoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 240 days.

(21) Appl. No.: 17/298,534

(22) PCT Filed: Nov. 22, 2019

(86) PCT No.: PCT/JP2019/045799
§ 371 (c)(1),
(2) Date: May 28, 2021

(87) PCT Pub. No.: WO2020/116204
PCT Pub. Date: Jun. 11, 2020

(65) Prior Publication Data
US 2022/0017117 A1 Jan. 20, 2022

(30) Foreign Application Priority Data
Dec. 7, 2018 (JP) .................. 2018-230175

(51) Int. Cl.
*B60W 60/00* (2020.01)
*B60W 50/00* (2006.01)
(Continued)

(52) U.S. Cl.
CPC ........ *B60W 60/0027* (2020.02); *B60W 50/00* (2013.01); *G01S 13/867* (2013.01);
(Continued)

(58) Field of Classification Search
CPC ............. B60W 60/0027; B60W 50/00; B60W 2050/0052; B60W 2420/42;
(Continued)

(56) References Cited

U.S. PATENT DOCUMENTS

2005/0134440 A1* 6/2005 Breed ................... G01S 17/931
701/45
2005/0275721 A1  12/2005 Ishii
(Continued)

FOREIGN PATENT DOCUMENTS

| CN | 1779483 A | 5/2006 |
|---|---|---|
| CN | 107924632 A | 4/2018 |

(Continued)

OTHER PUBLICATIONS

International Search Report and Written Opinion of PCT Application No. PCT/JP2019/045799, dated Feb. 18, 2020, 12 pages of ISRWO.

*Primary Examiner* — Ig T An
(74) *Attorney, Agent, or Firm* — CHIP LAW GROUP

(57) ABSTRACT

The present technology relates to an information processing apparatus, an information processing method, a program, a mobile-object control apparatus, and a mobile object that make it possible to appropriately set the accuracy in detecting an object.
An information processing apparatus includes a first object detector that performs an object detection on the basis of first sensor data from a first sensor; a second object detector that performs an object detection on the basis of second sensor data from a second sensor that differs in type from the first sensor; a tracking section that predicts a state of a target object that is a tracking target, on the basis of a result of the object detection performed on the basis of the first sensor data, and on the basis of a result of the object detection performed on the basis of the second sensor data; and a (Continued)

detection accuracy controller that sets a high-resolution range on the basis of the state of the target object that is predicted on the basis of the result of the object detection performed on the basis of the first sensor data, and on the basis of the result of the object detection performed on the basis of the second sensor data, the high-resolution range being a range in which an object detection is performed with a higher degree of accuracy than in a range other than the high-resolution range. The present technology is applicable to, for example, a system used to track a target object around a vehicle.

17 Claims, 8 Drawing Sheets

(51) Int. Cl.
    *G01S 13/86*    (2006.01)
    *G01S 13/931*    (2020.01)
    *G01S 17/87*    (2020.01)
    *G06T 3/40*    (2006.01)
    *G06T 7/292*    (2017.01)
    *G06V 20/58*    (2022.01)
    *G08G 1/16*    (2006.01)

(52) U.S. Cl.
    CPC ............... *G01S 17/87* (2013.01); *G06T 3/40* (2013.01); *G06T 7/292* (2017.01); *G06V 20/58* (2022.01); *G08G 1/166* (2013.01); *B60W 2050/0052* (2013.01); *B60W 2420/403* (2013.01); *B60W 2420/408* (2024.01); *B60W 2554/4042* (2020.02); *B60W 2554/4043* (2020.02); *B60W 2554/4044* (2020.02); *B60W 2554/801* (2020.02); *B60W 2554/802* (2020.02); *G01S 13/931* (2013.01); *G06T 2207/20016* (2013.01); *G06T 2207/30261* (2013.01); *G06V 2201/07* (2022.01)

(58) Field of Classification Search
    CPC ..... B60W 2420/52; B60W 2554/4042; B60W 2554/4043; B60W 2554/4044; B60W 2554/801; B60W 2554/802; G01S 13/867; G01S 17/87; G01S 13/931; G01S 13/726; G01S 13/865; G01S 17/86; G01S 17/894; G01S 17/931; G06T 3/40; G06T 7/292; G06T 2207/20016; G06T 2207/30261; G06V 20/58; G06V 2201/07; G08G 1/166; G08G 1/09623; H04N 7/18

See application file for complete search history.

(56) References Cited

U.S. PATENT DOCUMENTS

| | | | |
|---|---|---|---|
| 2006/0125679 | A1 | 6/2006 | Horibe |
| 2008/0164985 | A1* | 7/2008 | Iketani .................... G01S 17/86 340/435 |
| 2014/0205144 | A1 | 7/2014 | Inada |
| 2018/0095175 | A1 | 4/2018 | O'Keeffe |
| 2018/0141545 | A1* | 5/2018 | Freytag ............ B60W 50/0098 |
| 2019/0097932 | A1* | 3/2019 | Buczek ................. H04L 12/413 |
| 2019/0154439 | A1* | 5/2019 | Binder .................... G01B 11/26 |

FOREIGN PATENT DOCUMENTS

| | | | | |
|---|---|---|---|---|
| CN | 108028023 | A | 5/2018 | |
| CN | 108475469 | A | 8/2018 | |
| DE | 602005004365 | T2 | 1/2009 | |
| DE | 102014100641 | A1 | 7/2014 | |
| EP | 1666919 | A2 | 6/2006 | |
| JP | 06-124340 | A | 5/1994 | |
| JP | 11-153664 | A | 6/1999 | |
| JP | 2006-033793 | A | 2/2006 | |
| JP | 2006-151125 | A | 6/2006 | |
| JP | 2006-234513 | A | 9/2006 | |
| JP | 2008-172441 | A | 7/2008 | |
| JP | 2009-031299 | A | 2/2009 | |
| JP | 2009-217680 | | * 9/2009 | ............ B60R 21/00 |
| JP | 2009-217680 | A | 9/2009 | |
| JP | 2009-229374 | A | 10/2009 | |
| JP | 2014-142202 | A | 8/2014 | |
| WO | WO-2017149526 | A | 9/2017 | |
| WO | 2018/031830 | A1 | 2/2018 | |

* cited by examiner

INFORMATION PROCESSING APPARATUS, INFORMATION PROCESSING METHOD, MOBILE-OBJECT CONTROL APPARATUS, AND MOBILE OBJECT

CROSS REFERENCE TO RELATED APPLICATIONS

This application is a U.S. National Phase of International Patent Application No. PCT/JP2019/045799 filed on Nov. 22, 2019, which claims priority benefit of Japanese Patent Application No. JP 2018-230175 filed in the Japan Patent Office on Dec. 7, 2018. Each of the above-referenced applications is hereby incorporated herein by reference in its entirety.

TECHNICAL FIELD

The present technology relates to an information processing apparatus, an information processing method, a program, a mobile-object control apparatus, and a mobile object, and in particular, to an information processing apparatus, an information processing method, a program, a mobile-object control apparatus, and a mobile object that are suitable for use in tracking a target object.

BACKGROUND ART

It has been proposed, in the past, that the surroundings of a vehicle be monitored using a millimeter-wave radar and an image sensor, and the degree of accuracy in detecting information regarding an object in a fusion area be increased, the fusion area being an area in which an area covered by the millimeter-wave radar and an area covered by the image sensor overlap (for example, refer to Patent Literature 1).

CITATION LIST

Patent Literature

Patent Literature 1: Japanese Patent Application Laid-open No. 2009-31299

DISCLOSURE OF INVENTION

Technical Problem

However, Patent Literature 1 discloses that the fusion area is fixed, which is not always appropriate. For example, the accuracy in detecting information in the fusion area is always set high even when there exists no obstacle. This may result in an unnecessarily high processing load.

The present technology has been made in view of the circumstances described above, and makes it possible to appropriately set the accuracy in detecting an object.

Solution to Problem

An information processing apparatus according to a first aspect of the present technology includes a first object detector that performs an object detection on the basis of first sensor data from a first sensor; a second object detector that performs an object detection on the basis of second sensor data from a second sensor that differs in type from the first sensor; a tracking section that predicts a state of a target object that is a tracking target, on the basis of a result of the object detection performed on the basis of the first sensor data, and on the basis of a result of the object detection performed on the basis of the second sensor data; and a detection accuracy controller that sets a high-resolution range on the basis of the state of the target object that is predicted on the basis of the result of the object detection performed on the basis of the first sensor data, and on the basis of the result of the object detection performed on the basis of the second sensor data, the high-resolution range being a range in which an object detection is performed with a higher degree of accuracy than in a range other than the high-resolution range.

An information processing method according to the first aspect of the present technology is performed by the information processing apparatus, the information processing method including: performing an object detection on the basis of first sensor data from the first sensor; performing an object detection on the basis of second sensor data from the second sensor that differs in type from the first sensor; predicting a state of a target object that is a tracking target, on the basis of a result of the object detection performed on the basis of the first sensor data, and on the basis of a result of the object detection performed on the basis of the second sensor data; and setting a high-resolution range on the basis of the state of the target object that is predicted on the basis of the result of the object detection performed on the basis of the first sensor data, and on the basis of the result of the object detection performed on the basis of the second sensor data, the high-resolution range being a range in which an object detection is performed with a higher degree of accuracy than in a range other than the high-resolution range.

A program performs an object detection on the basis of first sensor data from the first sensor; performs an object detection on the basis of second sensor data from the second sensor that differs in type from the first sensor; predicts a state of a target object that is a tracking target, on the basis of a result of the object detection performed on the basis of the first sensor data, and on the basis of a result of the object detection performed on the basis of the second sensor data; and sets a high-resolution range on the basis of the state of the target object that is predicted on the basis of the result of the object detection performed on the basis of the first sensor data, and on the basis of the result of the object detection performed on the basis of the second sensor data, the high-resolution range being a range in which an object detection is performed with a higher degree of accuracy than in a range other than the high-resolution range.

A mobile-object control apparatus according to a second aspect of the present technology includes a first object detector that performs an object detection with respect to surroundings of a mobile object on the basis of first sensor data from a first sensor; a second object detector that performs an object detection with respect to the surroundings of the mobile object on the basis of second sensor data from a second sensor that differs in type from the first sensor; a tracking section that estimates and predicts a state of a target object that is a tracking target, on the basis of a result of the object detection performed on the basis of the first sensor data, and on the basis of a result of the object detection performed on the basis of the second sensor data; a detection accuracy controller that sets a high-resolution range on the basis of the state of the target object that is predicted on the basis of the result of the object detection performed on the basis of the first sensor data, and on the basis of the result of the object detection performed on the basis of the second sensor data, the high-resolution range being a range in which an object detection is performed with a higher degree of accuracy than in a range other than the high-resolution range; and a movement controller that controls movement of the mobile object on the basis of the state of the target object that is estimated on the basis of the result of the object detection performed on the basis of the first sensor data, and on the basis of a result of the object detection performed on the basis of the second sensor data.

A mobile object according to a third aspect of the present technology includes a first sensor; a second sensor that differs in type from the first sensor; a first object detector that performs an object detection on the basis of first sensor data from the first sensor; a second object detector that performs an object detection on the basis of second sensor data from the second sensor; a tracking section that estimates and predicts a state of a target object that is a tracking target, on the basis of a result of the object detection performed on the basis of the first sensor data, and on the basis of a result of the object detection performed on the basis of the second sensor data; a detection accuracy controller that sets a high-resolution range on the basis of the state of the target object that is predicted on the basis of the result of the object detection performed on the basis of the first sensor data, and on the basis of the result of the object detection performed on the basis of the second sensor data, the high-resolution range being a range in which an object detection is performed with a higher degree of accuracy than in a range other than the high-resolution range; and a movement controller that controls movement of the mobile object on the basis of the state of the target object that is estimated on the basis of the result of the object detection performed on the basis of the first sensor data, and on the basis of a result of the object detection performed on the basis of the second sensor data.

In the first aspect of the present technology, an object detection is performed on the basis of first sensor data from the first sensor; an object detection is performed on the basis of second sensor data from the second sensor that differs in type from the first sensor; a state of a target object that is a tracking target is predicted on the basis of a result of the object detection performed on the basis of the first sensor data, and on the basis of a result of the object detection performed on the basis of the second sensor data; and a high-resolution range is set on the basis of the state of the target object that is predicted on the basis of the result of the object detection performed on the basis of the first sensor data, and on the basis of the result of the object detection performed on the basis of the second sensor data, the high-resolution range being a range in which an object detection is performed with a higher degree of accuracy than in a range other than the high-resolution range.

In the second aspect of the present technology, an object detection is performed with respect to surroundings of a mobile object on the basis of first sensor data from the first sensor; an object detection is performed with respect to the surroundings of the mobile object on the basis of second sensor data from the second sensor that differs in type from the first sensor; a state of a target object that is a tracking target is estimated and predicted on the basis of a result of the object detection performed on the basis of the first sensor data, and on the basis of a result of the object detection performed on the basis of the second sensor data; a high-resolution range is set on the basis of the state of the target object that is predicted on the basis of the result of the object detection performed on the basis of the first sensor data, and on the basis of the result of the object detection performed on the basis of the second sensor data, the high-resolution range being a range in which an object detection is performed with a higher degree of accuracy than in a range other than the high-resolution range; and movement of the mobile object is controlled on the basis of the state of the target object that is estimated on the basis of the result of the object detection performed on the basis of the first sensor data, and on the basis of a result of the object detection performed on the basis of the second sensor data.

In the third aspect of the present technology, an object detection is performed on the basis of first sensor data from the first sensor; an object detection is performed on the basis of second sensor data from the second sensor that differs in type from the first sensor; a state of a target object that is a tracking target is estimated and predicted on the basis of a result of the object detection performed on the basis of the first sensor data, and on the basis of a result of the object detection performed on the basis of the second sensor data; a high-resolution range is set on the basis of the state of the target object that is predicted on the basis of the result of the object detection performed on the basis of the first sensor data, and on the basis of the result of the object detection performed on the basis of the second sensor data, the high-resolution range being a range in which an object detection is performed with a higher degree of accuracy than in a range other than the high-resolution range; and movement is controlled on the basis of the state of the target object that is estimated on the basis of the result of the object detection performed on the basis of the first sensor data, and on the basis of a result of the object detection performed on the basis of the second sensor data.

MODE(S) FOR CARRYING OUT THE INVENTION

Embodiments for carrying out the present technology are described below. The description is made in the following order.

1. First Embodiment (Example of Using Camera and Millimeter-Wave Radar)
2. Second Embodiment (Example of Adding LiDAR)
3. Modifications
4. Others 1. First Embodiment First, a first embodiment of the present technology is described with reference to FIGS. 1 to 6.

Figure 1:
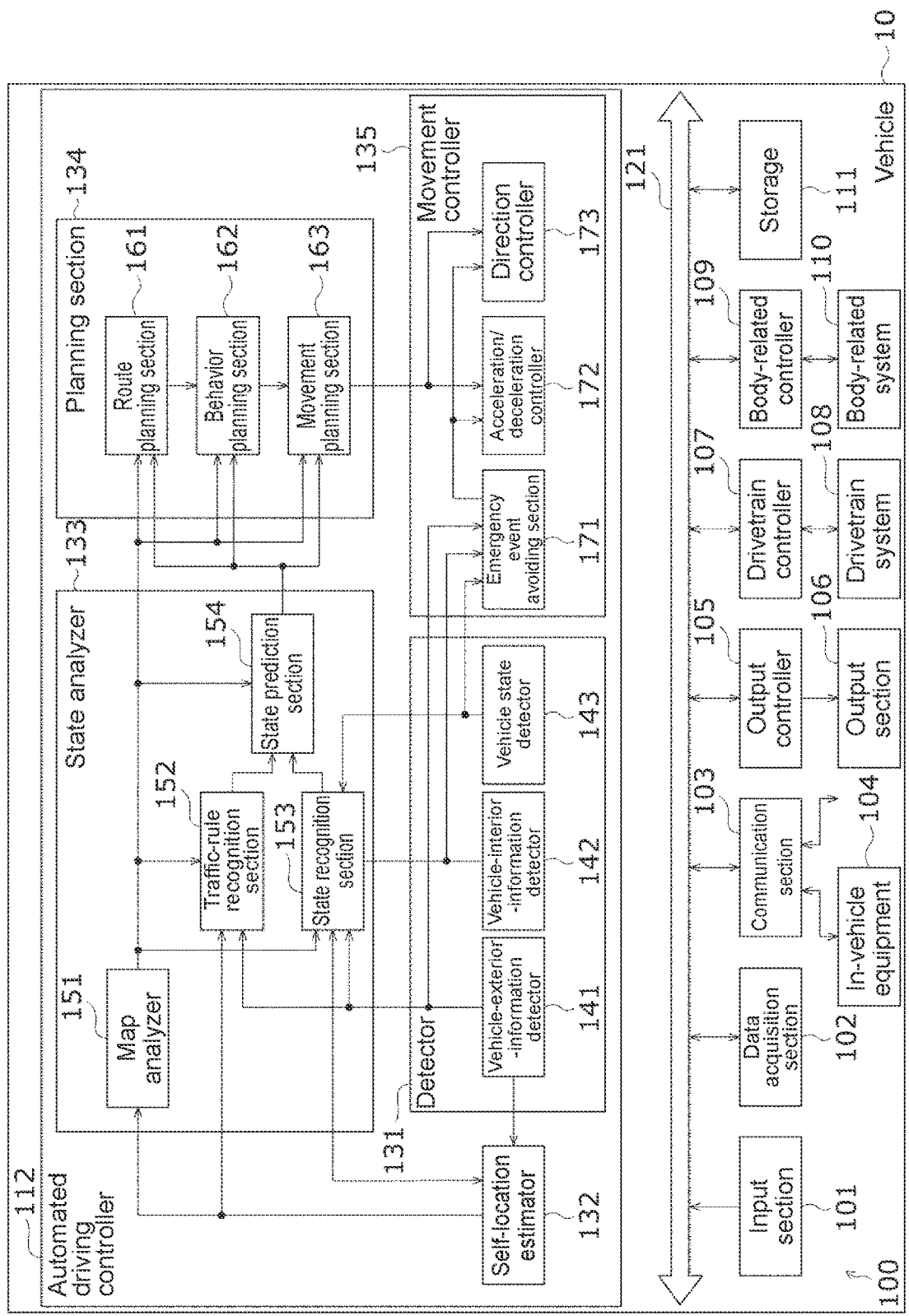
FIG. 1 is a block diagram illustrating an example of a configuration of a vehicle control system to which the present technology is applied.

FIG. 1 is a block diagram illustrating an example of a schematic functional configuration of a vehicle control system 100 that is an example of a mobile-object control system to which the present technology is applicable.

Note that, when a vehicle 10 provided with the vehicle control system 100 is to be distinguished from other vehicles, the vehicle provided with the vehicle control system 100 will be hereinafter referred to as an own automobile or an own vehicle.

The vehicle control system 100 includes an input section 101, a data acquisition section 102, a communication section 103, in-vehicle equipment 104, an output controller 105, an output section 106, a drivetrain controller 107, a drivetrain system 108, a body-related controller 109, a body-related system 110, a storage 111, and an automated driving controller 112. The input section 101, the data acquisition section 102, the communication section 103, the output controller 105, the drivetrain controller 107, the body-related controller 109, the storage 111, and the automated driving controller 112 are connected to each other through a communication network 121. For example, the communication network 121 includes a bus or a vehicle-mounted communication network compliant with any standard such as a controller area network (CAN), a local interconnect network (LIN), a local area network (LAN), or FlexRay (registered trademark). Note that the respective structural elements of the vehicle control system 100 may be directly connected to each other without using the communication network 121.

Note that the description of the communication network 121 will be omitted below when the respective structural elements of the vehicle control system 100 communicate with each other through the communication network 121. For example, when the input section 101 and the automated driving controller 112 communicate with each other through the communication network 121, it will be simply stated that the input section 101 and the automated driving controller 112 communicate with each other.

The input section 101 includes an apparatus used by a person on board to input various pieces of data, instructions, and the like. For example, the input section 101 includes an operation device such as a touch panel, a button, a microphone, a switch, and a lever; an operation device with which input can be performed by a method other than a manual operation, such as sound or a gesture; and the like. Alternatively, for example, the input section 101 may be externally connected equipment such as a remote-control apparatus using infrared or another radio wave, or mobile equipment or wearable equipment compatible with an operation of the vehicle control system 100. The input section 101 generates an input signal on the basis of data, an instruction, or the like input by a person on board, and supplies the generated input signal to the respective structural elements of the vehicle control system 100.

The data acquisition section 102 includes various sensors and the like for acquiring data used for a process performed by the vehicle control system 100, and supplies the acquired data to the respective structural elements of the vehicle control system 100.

For example, the data acquisition section 102 includes various sensors used to detect, for example, a state of the own automobile. Specifically, for example, the data acquisition section 102 includes a gyroscope; an acceleration sensor; an inertial measurement unit (IMU); and a sensor or the like used to detect an amount of operation of an accelerator pedal, an amount of operation of a brake pedal, a steering angle of a steering wheel, the number of revolutions of an engine, the number of revolutions of a motor, a speed of wheel rotation, or the like.

Further, for example, the data acquisition section 102 includes various sensors used to detect information regarding the outside of the own automobile. Specifically, for example, the data acquisition section 102 includes an image-capturing apparatus such as a time-of-flight (ToF) camera, a stereo camera, a monocular camera, an infrared camera, and other cameras. Furthermore, for example, the data acquisition section 102 includes an environment sensor used to detect weather, a meteorological phenomenon, or the like, and a surrounding-information detection sensor used to detect an object around the own automobile. For example, the environment sensor includes a raindrop sensor, a fog sensor, a sunshine sensor, a snow sensor, and the like. The surrounding-information detection sensor includes an ultrasonic sensor, a radar, LiDAR (light detection and ranging, laser imaging detection and ranging), a sonar, and the like.

Moreover, for example, the data acquisition section 102 includes various sensors used to detect the current location of the own automobile. Specifically, for example, the data acquisition section 102 includes, for example, a global navigation satellite system (GNSS) receiver that receives a GNSS signal from a GNSS satellite.

Further, for example, the data acquisition section 102 includes various sensors used to detect information regarding the inside of a vehicle. Specifically, for example, the data acquisition section 102 includes an image-capturing apparatus that captures an image of a driver, a biological sensor that detects biological information of the driver, a microphone that collects sound in the interior of a vehicle, and the like. For example, the biological sensor is provided to a seat surface, the steering wheel, or the like, and detects biological information of a person on board sitting on a seat, or a driver holding the steering wheel.

The communication section 103 communicates with the in-vehicle equipment 104 as well as various pieces of vehicle-exterior equipment, a server, a base station, and the like, transmits data supplied by the respective structural elements of the vehicle control system 100, and supplies the received data to the respective structural elements of the vehicle control system 100. Note that a communication protocol supported by the communication section 103 is not particularly limited. It is also possible for the communication section 103 to support a plurality of types of communication protocols.

For example, the communication section 103 wirelessly communicates with the in-vehicle equipment 104 using a wireless LAN, Bluetooth (registered trademark), near-field communication (NFC), a wireless USB (WUSB), or the like. Further, for example, the communication section 103 communicates with the in-vehicle equipment 104 by wire using a universal serial bus (USB), a high-definition multimedia interface (HDMI) (registered trademark), a mobile high-definition link (MHL), or the like through a connection terminal (not illustrated) (and a cable if necessary).

Further, for example, the communication section 103 communicates with equipment (for example, an application server or a control server) situated in an external network (for example, the Internet, a cloud network, or a carrier-specific network) through a base station or an access point. Furthermore, for example, the communication section 103 communicates with a terminal (for example, a terminal of a pedestrian or a store, or a machine-type communication (MTC) terminal) situated near the own automobile, using a peer-to-peer (P2P) technology. Moreover, for example, the communication section 103 performs V2X communication such as vehicle-to-vehicle communication, vehicle-to-infrastructure communication, vehicle-to-home communication between the own automobile and a home, and vehicle-to-pedestrian communication. Further, for example, the communication section 103 includes a beacon receiver, receives a radio wave or an electromagnetic wave transmitted from, for example, a radio station installed on a road, and acquires information regarding, for example, the current location, traffic congestion, traffic regulation, or a necessary time.

Examples of the in-vehicle equipment 104 include mobile equipment or wearable equipment of a person on board, information equipment that is brought in or attached to the own automobile, and a navigation apparatus that searches for a route to any destination.

The output controller 105 controls output of various pieces of information to a person on board of the own automobile or to the outside of the own automobile. For example, the output controller 105 generates an output signal that includes at least one of visual information (such as image data) or audio information (such as sound data), supplies the output signal to the output section 106, and thereby controls output of the visual information and the audio information from the output section 106. Specifically, for example, the output controller 105 combines pieces of data of images captured by different image-capturing apparatuses of the data acquisition section 102, generates a bird's-eye image, a panoramic image, or the like, and supplies an output signal including the generated image to the output section 106. Further, for example, the output controller 105 generates sound data including, for example, a warning beep or a warning message alerting a danger such as collision, contact, or entrance into a dangerous zone, and supplies an output signal including the generated sound data to the output section 106.

The output section 106 includes an apparatus capable of outputting the visual information or the audio information to a person on board of the own automobile or to the outside of the own automobile. For example, the output section 106 includes a display apparatus, an instrument panel, an audio speaker, headphones, a wearable device such as an eyeglass-type display used to be worn on the person on board, a projector, a lamp, and the like. Instead of an apparatus including a commonly used display, the display apparatus included in the output section 106 may be an apparatus, such as a head-up display, a transparent display, or an apparatus including an augmented reality (AR) display function, that displays the visual information in the field of view of a driver.

The drivetrain controller 107 generates various control signals, supplies them to the drivetrain system 108, and thereby controls the drivetrain system 108. Further, the drivetrain controller 107 supplies the control signals to the structural elements other than the drivetrain system 108 as necessary to, for example, notify them of a state of controlling the drivetrain system 108.

The drivetrain system 108 includes various apparatuses related to the drivetrain of the own automobile. For example, the drivetrain system 108 includes a driving force generation apparatus, such as an internal-combustion engine and a driving motor, that generates driving force, a driving force transmitting mechanism used to transmit the driving force to wheels, a steering mechanism that adjusts the steering angle, a braking apparatus that generates a braking force, an antilock braking system (ABS), an electronic stability control (ESC) system, an electric power steering apparatus, and the like.

The body-related controller 109 generates various control signals, supplies them to the body-related system 110, and thereby controls the body-related system 110. Further, the body-related controller 109 supplies the control signals to the structural elements other than the body-related system 110 as necessary to, for example, notify them of a state of controlling the body-related system 110.

The body-related system 110 includes various body-related apparatuses provided to a vehicle body. For example, the body-related system 110 includes a keyless entry system, a smart key system, a power window apparatus, a power seat, a steering wheel, an air conditioner, various lamps (such as a headlamp, a tail lamp, a brake lamp, a blinker, and a fog lamp), and the like.

For example, the storage 111 includes a read only memory (ROM), a random access memory (RAM), a magnetic storage device such as a hard disc drive (HDD), a semiconductor storage device, an optical storage device, a magneto-optical storage device, and the like. The storage 111 stores therein various programs, data, and the like that are used by the respective structural elements of the vehicle control system 100. For example, the storage 111 stores therein map data such as a three-dimensional high-accuracy map, a global map, and a local map. The high-accuracy map is a dynamic map or the like. The global map is less accurate and covers a wider area than the high-accuracy map. The local map includes information regarding the surroundings of the own automobile.

The automated driving controller 112 performs control related to automated driving such as autonomous traveling or a driving assistance. Specifically, for example, the automated driving controller 112 performs a cooperative control intended to implement a function of an advanced driver-assistance system (ADAS) including collision avoidance or shock mitigation for the own automobile, traveling after a leading vehicle based on a distance between vehicles, traveling while maintaining a vehicle speed, a warning of collision of the own automobile, a warning of deviation of the own automobile from a lane, and the like. Further, for example, the automated driving controller 112 performs a cooperative control intended to achieve, for example, automated driving that is autonomous traveling without an operation performed by a driver. The automated driving controller 112 includes a detector 131, a self-location estimator 132, a state analyzer 133, a planning section 134, and a movement controller 135.

The detector 131 detects various pieces of information necessary to control automated driving. The detector 131 includes a vehicle-exterior-information detector 141, a vehicle-interior-information detector 142, and a vehicle state detector 143.

The vehicle-exterior-information detector 141 performs a process of detecting information regarding the outside of the own automobile on the basis of data or a signal from each structural element of the vehicle control system 100. For example, the vehicle-exterior-information detector 141 performs processes of detecting, recognizing, and tracking an object around the own automobile, and a process of detecting a distance to the object. Examples of the detection-target object include a vehicle, a person, an obstacle, a structure, a road, a traffic light, a traffic sign, and a road sign. Further, for example, the vehicle-exterior-information detector 141 performs a process of detecting an environment surrounding the own automobile. Examples of the detection-target surrounding environment include weather, temperature, humidity, brightness, and a road surface condition. The vehicle-exterior-information detector 141 supplies data indicating a result of the detection process to, for example, the self-location estimator 132; a map analyzer 151, a traffic-rule recognition section 152, and a state recognition section 153 of the state analyzer 133; and an emergency event avoiding section 171 of the movement controller 135.

The vehicle-interior-information detector 142 performs a process of detecting information regarding the inside of a vehicle on the basis of data or a signal from each structural element of the vehicle control system 100. For example, the vehicle-interior-information detector 142 performs processes of authenticating and recognizing a driver, a process of detecting a state of the driver, a process of detecting a person on board, and a process of detecting a vehicle interior environment. Examples of the detection-target state of a driver include a physical condition, a degree of arousal, a degree of concentration, a degree of fatigue, and a direction of a line of sight. Examples of the detection-target vehicle interior environment include temperature, humidity, brightness, and odor. The vehicle-interior-information detector 142 supplies data indicating a result of the detection process to, for example, the state recognition section 153 of the state analyzer 133 and the emergency event avoiding section 171 of the movement controller 135.

The vehicle state detector 143 performs a process of detecting a state of the own automobile on the basis of data or a signal from each structural element of the vehicle control system 100. Examples of the detection-target state of the own automobile include speed, acceleration, a steering angle, the presence or absence of anomaly and its details, a driving operation state, a position and an inclination of a power seat, a state of a door lock, and states of other pieces of vehicle-mounted equipment. The vehicle state detector 143 supplies data indicating a result of the detection process to, for example, the state recognition section 153 of the state analyzer 133 and the emergency event avoiding section 171 of the movement controller 135.

The self-location estimator 132 performs a process of estimating a location, a posture, and the like of the own automobile on the basis of data or signals from the respective structural elements of the vehicle control system 100, such as the vehicle-exterior-information detector 141, and the state recognition section 153 of the state analyzer 133. Further, the self-location estimator 132 generates, as necessary, a local map (hereinafter referred to as a self-location estimation map) used to estimate a self-location. For example, the self-location estimation map is a high-accuracy map using a technology such as simultaneous localization and mapping (SLAM). The self-location estimator 132 supplies data indicating a result of the estimation process to, for example, the map analyzer 151, the traffic-rule recognition section 152, and the state recognition section 153 of the state analyzer 133. Further, the self-location estimator 132 stores the self-location estimation map in the storage 111.

The state analyzer 133 performs a process of analyzing states of the own automobile and its surroundings. The state analyzer 133 includes the map analyzer 151, the traffic-rule recognition section 152, the state recognition section 153, and a state prediction section 154.

Using, as necessary, data or signals from the respective structural elements of the vehicle control system 100, such as the self-location estimator 132 and the vehicle-exterior-information detector 141, the map analyzer 151 performs a process of analyzing various maps stored in the storage 111, and constructs a map including information necessary for an automated driving process. The map analyzer 151 supplies the constructed map to, for example, the traffic-rule recognition section 152, the state recognition section 153, and the state prediction section 154, as well as a route planning section 161, a behavior planning section 162, and a movement planning section 163 of the planning section 134.

The traffic-rule recognition section 152 performs a process of recognizing traffic rules around the own automobile on the basis of data or signals from the respective structural elements of the vehicle control system 100, such as the self-location estimator 132, the vehicle-exterior-information detector 141, and the map analyzer 151. The recognition process makes it possible to recognize a location and a state of a traffic light around the own automobile, the details of traffic control performed around the own automobile, and a travelable lane. The traffic-rule recognition section 152 supplies data indicating a result of the recognition process to, for example, the state prediction section 154.

The state recognition section 153 performs a process of recognizing a state related to the own automobile on the basis of data or signals from the respective structural elements of the vehicle control system 100, such as the self-location estimator 132, the vehicle-exterior-information detector 141, the vehicle-interior-information detector 142, the vehicle state detector 143, and the map analyzer 151. For example, the state recognition section 153 performs a process of recognizing a state of the own automobile, a state of the surroundings of the own automobile, a state of a driver of the own automobile, and the like. Further, the state recognition section 153 generates, as necessary, a local map (hereinafter referred to as a state recognition map) used to recognize the state of the surroundings of the own automobile. The state recognition map is, for example, an occupancy grid map.

Examples of the recognition-target state of the own automobile include a location, a posture, and movement (such as speed, acceleration, and a movement direction) of the own automobile, as well as the presence or absence of anomaly and its details. Examples of the recognition-target state of the surroundings of the own automobile include the type and a location of a stationary object around the own automobile; the type, a location, and movement (such as speed, acceleration, and a movement direction) of a moving object around the own automobile; a structure of a road around the own automobile and a condition of the surface of the road; and weather, temperature, humidity, and brightness around the own automobile. Examples of the recognition-target state of a driver include a physical condition, a degree of arousal, a degree of concentration, a degree of fatigue, movement of a line of sight, and a driving operation.

The state recognition section 153 supplies data indicating a result of the recognition process (including a state recognition map as necessary) to, for example, the self-location estimator 132 and the state prediction section 154. Further, the state recognition section 153 stores the state-recognition map in the storage 111.

The state prediction section 154 performs a process of predicting a state related to the own automobile on the basis of data or signals from the respective structural elements of the vehicle control system 100, such as the map analyzer 151, the traffic-rule recognition section 152, and the state recognition section 153. For example, the state prediction section 154 performs a process of predicting a state of the own automobile, a state of the surroundings of the own automobile, a state of a driver, and the like.

Examples of the prediction-target state of the own automobile include the behavior of the own automobile, the occurrence of anomaly in the own automobile, and a travelable distance of the own automobile. Examples of the prediction-target state of the surroundings of the own automobile include the behavior of a moving object, a change in a state of a traffic light, and a change in environment such as weather around the own automobile. Examples of the prediction-target state of a driver include the behavior and the physical condition of the driver.

The state prediction section 154 supplies data indicating a result of the prediction process to, for example, the route planning section 161, the behavior planning section 162, and the movement planning section 163 of the planning section 134 together with the data from the traffic-rule recognition section 152 and the state recognition section 153.

The route planning section 161 plans a route to a destination on the basis of data or signals from the respective structural elements of the vehicle control system 100, such as the map analyzer 151 and the state prediction section 154. For example, the route planning section 161 sets a route from the current location to a specified destination on the basis of a global map. Further, for example, the route planning section 161 changes a route as appropriate on the basis of the states of, for example, traffic congestion, an accident, traffic regulation, and a construction, as well as the physical condition of a driver. The route planning section 161 supplies data indicating the planned route to, for example, the behavior planning section 162.

On the basis of data or signals from the respective structural elements of the vehicle control system 100, such as the map analyzer 151 and the state prediction section 154, the behavior planning section 162 plans the behavior of the own automobile in order for the own automobile to travel safely on the route planned by the route planning section 161 within a time planned by the route planning section 161. For example, the behavior planning section 162 makes plans about, for example, a start to move, a stop, a travel direction (such as a forward movement, a backward movement, a left turn, a right turn, and a change in direction), a lane for traveling, a traveling speed, and passing. The behavior planning section 162 supplies data indicating the planned behavior of the own automobile to, for example, the movement planning section 163.

On the basis of data or signals from the respective structural elements of the vehicle control system 100, such as the map analyzer 151 and the state prediction section 154, the movement planning section 163 plans movement of the own automobile in order to achieve the behavior planned by the behavior planning section 162. For example, the movement planning section 163 makes plans about, for example, acceleration, deceleration, and a traveling course. The movement planning section 163 supplies data indicating the planned movement of the own automobile to, for example, an acceleration/deceleration controller 172 and a direction controller 173 of the movement controller 135.

The movement controller 135 controls movement of the own automobile. The movement controller 135 includes the emergency event avoiding section 171, the acceleration/deceleration controller 172, and the direction controller 173.

On the basis of a result of the detections performed by the vehicle-exterior-information detector 141, the vehicle-interior-information detector 142, and the vehicle state detector 143, the emergency event avoiding section 171 performs a process of detecting emergency events such as collision, contact, entrance into a dangerous zone, something unusual in a driver, and anomaly in the vehicle. When the emergency event avoiding section 171 detects the occurrence of an emergency event, the emergency event avoiding section 171 plans movement of the own automobile such as a sudden stop or a quick turning for avoiding the emergency event. The emergency event avoiding section 171 supplies data indicating the planned movement of the own automobile to, for example, the acceleration/deceleration controller 172 and the direction controller 173.

The acceleration/deceleration controller 172 controls acceleration/deceleration to achieve the movement of the own automobile planned by the movement planning section 163 or the emergency event avoiding section 171. For example, the acceleration/deceleration controller 172 computes a control target value for a driving force generation apparatus or a braking apparatus to achieve the planned acceleration, the planned deceleration, or the planned sudden stop, and supplies a control instruction indicating the computed control target value to the drivetrain controller 107.

The direction controller 173 controls a direction to achieve the movement of the own automobile planned by the movement planning section 163 or the emergency event avoiding section 171. For example, the direction controller 173 computes a control target value for a steering mechanism to achieve the traveling course planned by the movement planning section 163 or the quick turning planned by the emergency event avoiding section 171, and supplies a control instruction indicating the computed control target value to the drivetrain controller 107.

<Examples of Configurations of Data Acquisition Section 102A and Vehicle-Exterior-Information Detector 141A>

Figure 2:
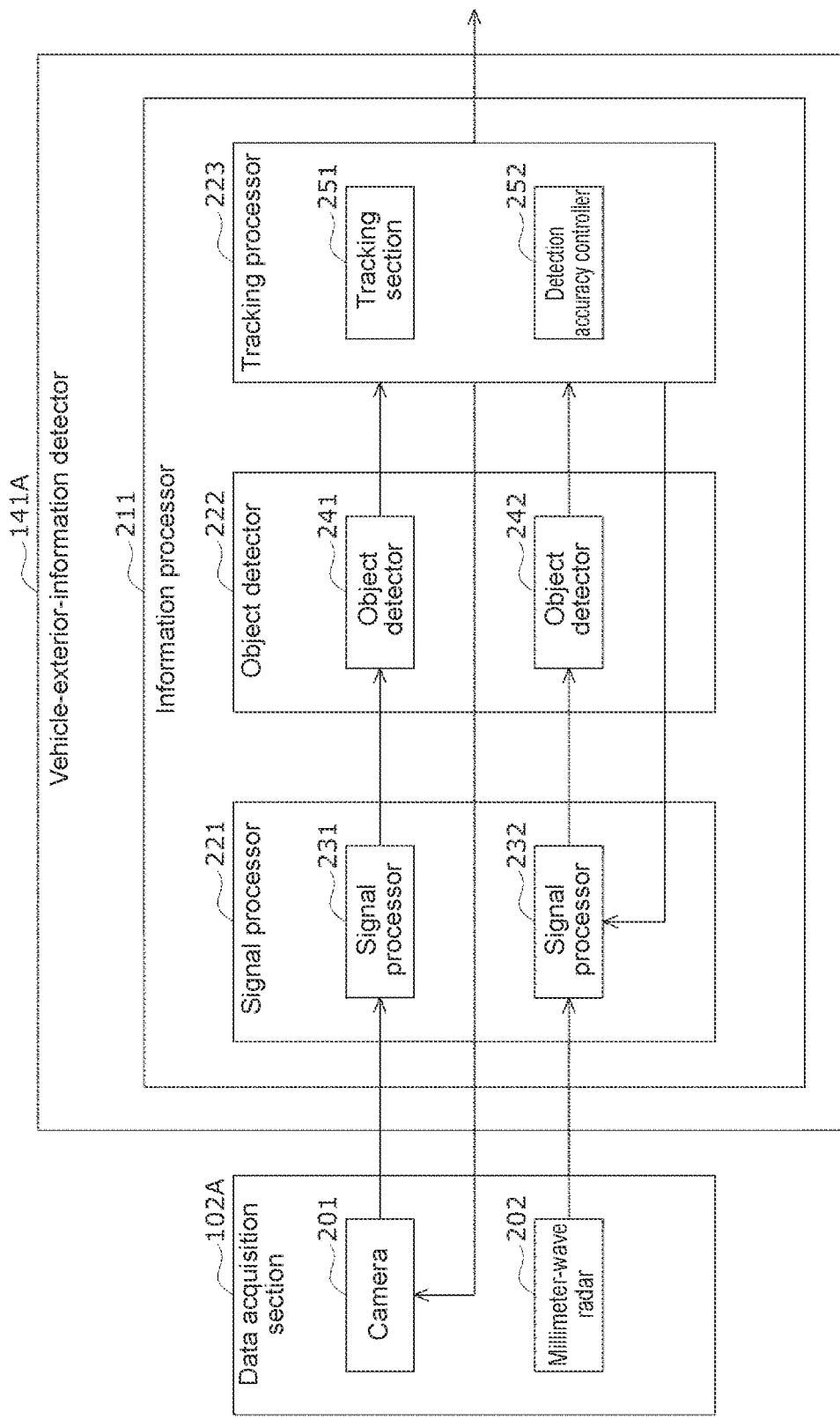
FIG. 2 is a block diagram illustrating a first embodiment of a data acquisition section and a first embodiment of a vehicle-exterior-information detector.

FIG. 2 illustrates portions of examples of configurations of a data acquisition section 102A that is a first embodiment of the data acquisition section 102 in the vehicle control system 100, and a vehicle-exterior-information detector 141A that is a first embodiment of the vehicle-exterior-information detector 141 in the vehicle control system 100.

The data acquisition section 102A includes a camera 201 and a millimeter-wave radar 202. The vehicle-exterior-information detector 141A includes an information processor 211. The information processor 211 includes a signal processor 221, an object detector 222, and a tracking processor 223. The signal processor 221 includes a signal processor 231 and a signal processor 232. The object detector 222 includes an object detector 241 and an object detector 242. The tracking processor 223 includes a tracking section 251 and a detection accuracy controller 252.

The camera 201 is, for example, a very high-definition (for example, a 10-megapixel) camera. The camera 201 captures an image of, for example, a region situated ahead of the vehicle 10. The camera 201 reduces the number of pixels in an image obtained by performing image-capturing (hereinafter referred to as a captured image) to generate a low-resolution image with a reduced resolution. Further, from the captured image, the camera 201 cuts out an image in a high-definition reading range set by the detection accuracy controller 252 of the vehicle-exterior-information detector 141A to generate a crop image. The camera 201 supplies the low-resolution image and the crop image to the signal processor 231.

The millimeter-wave radar 202 performs sensing with respect to a region situated ahead of the vehicle 10, and sensing ranges of the millimeter-wave radar 202 and the camera 201 at least partially overlap. For example, the millimeter-wave radar 202 transmits a transmission signal including a millimeter wave in a forward direction of the vehicle 10, and receives, using a reception antenna, a reception signal that is a signal reflected off an object situated ahead of the vehicle 10. For example, a plurality of reception antennas is arranged at specified intervals in a lateral direction (a width direction) of the vehicle 10. Further, a plurality of reception antennas may also be arranged in the height direction. The millimeter-wave radar 202 supplies the signal processor 232 with data (hereinafter referred to as millimeter-wave data) that chronologically indicates the intensity of a reception signal received using each reception antenna.

The signal processor 231 performs specified signal processing on the low-resolution image and the crop image. For example, the signal processor 231 performs RGB development on the low-resolution image and the crop image. In other words, the signal processor 231 performs processing of interpolating an R component, a G component, and a B component for each pixel of the low-resolution image and the crop image. The signal processor 231 supplies the object detector 241 with the low-resolution image and the crop image on which the signal processing has been performed.

The signal processor 232 performs specified signal processing on the millimeter-wave data to estimate a distance to, a direction of, and a speed of an object (a reflector) situated ahead of the vehicle 10. The signal processor 232 generates a radar map indicating the distance to, the direction of, and the speed of each object situated ahead of the vehicle 10, as well as the intensity of a reception signal reflected off the object, and supplies the radar map to the object detector 242.

The object detector 241 performs processing of detecting an object situated ahead of the vehicle 10 on the basis of the low-resolution image and the crop image. The object detector 241 supplies the tracking processor 223 with data indicating a result of the detection of the object.

The object detector 242 performs processing of detecting an object situated ahead of the vehicle 10 on the basis of the radar map. The object detector 242 supplies the tracking processor 223 with data indicating a result of the detection of the object.

For example, the tracking section 251 performs processing of tracking a target object situated ahead of the vehicle 10 using a filter, such as a Kalman filter or a particle filter, that is used to estimate and predict the state on the basis of an observation value. For example, the tracking section 251 estimates a current state of a target object situated ahead of the vehicle 10 on the basis of the result of the detection of an object that is performed by the object detector 241, the result of the detection of an object that is performed by the object detector 242, and a result of predicting a state of the target object situated ahead of the vehicle 10. Further, the tracking section 251 predicts a future state of the target object situated ahead of the vehicle 10 on the basis of the result of the detection of an object that is performed by the object detector 241, the result of the detection of an object that is performed by the object detector 242, and a result of the estimation of the current state of the target object situated ahead of the vehicle 10 that is performed by the tracking section 251.

Here, the target object is a tracking-target object situated ahead of the vehicle 10, and any object may be set to be the target object. However, it is favorable that an object that includes a portion having a high reflectivity of a transmission signal of the millimeter-wave radar 202 be set to be a target object. The case in which the target object is a vehicle is appropriately described below as an example.

Further, for example, a location, a speed, and the like of a target object are estimated and predicted as states of the target object.

The tracking section 251 supplies data indicating the result of estimating the state of the target object to, for example, the self-location estimator 132; the map analyzer 151, the traffic-rule recognition section 152, and the state recognition section 153 of the state analyzer 133; and the emergency event avoiding section 171 of the movement controller 135.

The detection accuracy controller 252 controls the accuracy in detecting an object on the basis of a result of predicting the state of the target object situated ahead of the vehicle 10. Specifically, the detection accuracy controller 252 sets a high-definition reading range on the basis of a predicted location of the target object. The detection accuracy controller 252 generates a reading control signal indicating the high-definition reading range, and supplies the reading control signal to the camera 201. Further, the detection accuracy controller 252 sets a high-definition processing range on the basis of the predicted location and a predicted speed of the target object. The detection accuracy controller 252 generates a signal-processing control signal indicating the high-definition processing range, and supplies the signal-processing control signal to the signal processor 232.

<Example of Configuration of Camera 201>

Figure 3:
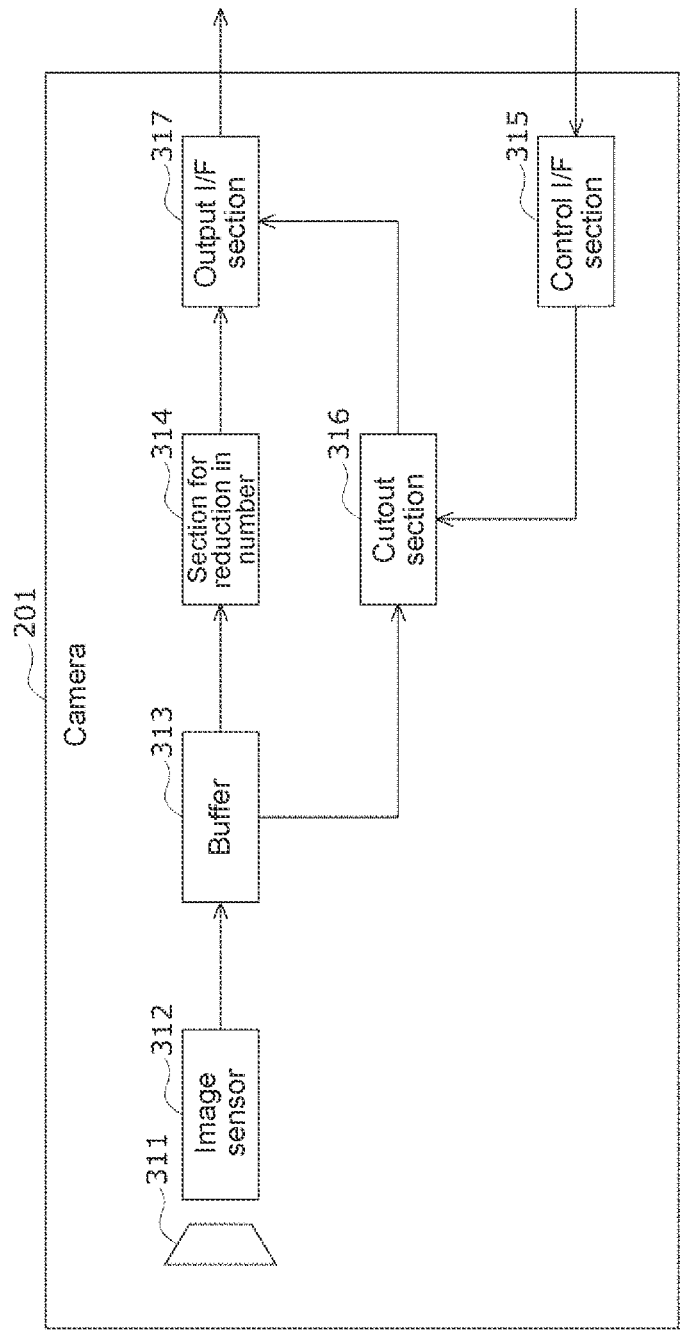
FIG. 3 is a block diagram illustrating an example of a configuration of a camera.

FIG. 3 illustrates an example of a configuration of the camera 201. The camera 201 includes a lens 311, an image sensor 312, a buffer 313, a section 314 for reduction in number, a control interface (I/F) section 315, a cutout section 316, and an output interface (I/F) section 317.

The lens 311 forms an image of a subject on a light-receiving surface of the image sensor 312.

The image sensor 312 is a high-definition (for example, a 10-megapixel) image sensor. Any type of image sensor such as a CMOS image sensor or a CCD image sensor can be used as the image sensor 312. The image sensor 312 captures an image of the subject, and temporarily stores the obtained captured image in the buffer 313.

The section 314 for reduction in number reduces the number of pixels of the captured image stored in the buffer 313 to generate a low-resolution image with a reduced resolution. The section 314 for reduction in number supplies the low-resolution image to the output I/F section 317.

The control I/F section 315 receives a reading control signal from the detection accuracy controller 252 of the vehicle-exterior-information detector 141A, and supplies the reading control signal to the cutout section 316.

From the captured image stored in the buffer 313, the cutout section 316 cuts out an image in a high-definition reading range indicated by the reading control signal to generate a crop image. The cutout section 316 supplies the crop image to the output I/F section 317.

The output I/F section 317 supplies the low-resolution image and the crop image to the signal processor 231.

<Target-Object Tracking Processing>

Next, target-object tracking processing performed by the vehicle 10 is described with reference to a flowchart of FIG. 4.

This processing is started when, for example, an operation for activating the vehicle 10 to start driving is performed, that is, when, for example, an ignition switch, a power switch, a start switch, or the like of the vehicle 10 is turned on. Further, this processing is terminated when, for example, an operation for terminating the driving of the vehicle 10 is performed, that is, when, for example, the ignition switch, the power switch, the start switch, or the like of the vehicle 10 is turned off.

In Step S1, the vehicle 10 performs object detection processing on the basis of a captured image. According to this processing, an object in the captured image of a region situated ahead of the vehicle 10 is detected, and data indicating a region of the object in the captured image and the type of the object is supplied from the object detector 241 to the tracking processor 423.

Note that this processing is described in detail later.

In Step S2, the vehicle 10 performs object detection processing on the basis of millimeter-wave data. According to this processing, an object situated ahead of the vehicle 10 is detected, and data indicating a location and a speed of the detected object is supplied from the object detector 242 to the tracking processor 423.

Note that this processing is described in detail later.

Further, the object detection processing performed on the basis of a captured image and the object detection processing performed on the basis of millimeter-wave data are not necessarily be performed in the order described above. For example, the processing performed on the basis of a captured image and the processing performed on the basis of millimeter-wave data may be performed in reverse order, or may be performed in parallel.

In Step S3, the tracking section 251 performs processing of tracking a target object. Specifically, the tracking section 251 estimates a current state of the target object (at a time t) on the basis of a result of the detection of the region of the object in the captured image and the type of the object that is performed by the object detector 241, a result of the detection of the location and the speed of the object that is performed by the object detector 242, and a result of predicting the current state of the target object (at the time t) in the process of Step S4 performed in most recently performed object-target tracking processing (at a time t−1). For example, on the basis of a result of the detection of the region of the object in the captured image and the type of the object that is performed by the object detector 241, and a result of the detection of the location and the speed of the object that is performed by the object detector 242, the tracking section 251 corrects a result of predicting the current state of the target object to estimate the current state of the target object. Accordingly, the current location and the current speed of the target object is estimated.

Note that the location of a target object is represented by, for example, a distance from the vehicle 10 and a direction (an angle) with respect to a traveling direction (a front direction) of the vehicle 10. The speed of the target object is represented by, for example, a relative speed with respect to the vehicle 10.

The tracking section 251 supplies data indicating a result of estimating the current state of the target object to, for example, the self-location estimator 132; the map analyzer 151, the traffic-rule recognition section 152, and the state recognition section 153 of the state analyzer 133; and the emergency event avoiding section 171 of the movement controller 135.

On the basis of, for example, the result of estimating the state of the target object, the self-location estimator 132 performs a process of estimating a location, a posture, and the like of the vehicle 10.

On the basis of, for example, the result of estimating the state of the target object, the map analyzer 151 performs a process of analyzing various maps stored in the storage 111, and constructs a map including information necessary for an automated driving process.

On the basis of, for example, the result of estimating the state of the target object, the traffic-rule recognition section 152 performs a process of recognizing traffic rules around the vehicle 10.

On the basis of, for example, the result of estimating the state of the target object, the state recognition section 153 performs a process of recognizing a state of the surroundings of the vehicle 10.

When the emergency event avoiding section 171 detects the occurrence of an emergency event on the basis of, for example, the result of estimating the state of the target object, the emergency event avoiding section 171 plans movement of the vehicle 10 such as a sudden stop or a quick turning for avoiding the emergency event.

In Step S4, the tracking section 251 predicts a state of the target object. For example, the tracking section 251 predicts a next state of the target object (at a time t+1) on the basis of the result of estimating the current state of the target object (at the time t). Accordingly, a next location (distance and direction (angle)) and a next speed (relative speed) of the target object are predicted.

In Step S5, the detection accuracy controller 252 controls the accuracy in detecting an object on the basis of the predicted state of the target object.

Specifically, the detection accuracy controller 252 sets a high-definition reading range on the basis of the predicted location of the target object. For example, the detection accuracy controller 252 sets a rectangular region in the captured image to be the high-definition reading range, the rectangular region being centered at a predicted location of the target object, the predicted location being situated a distance not less than a specified distance away from the vehicle 10. The size and the shape of the rectangle of the high-definition reading region may be fixed, or may be changed according to the size and the shape of the target object. Through the control I/F section 315 of the camera 201, the detection accuracy controller 252 supplies the cutout section 316 with a reading control signal indicating the high-definition reading range.

Further, the detection accuracy controller 252 sets a high-definition processing range on the basis of the predicted location and the predicted speed of the target object. For example, the detection accuracy controller 252 sets, to be the high-definition processing range, a distance-and-speed range in which the value of a predicted distance to a target object that is being tracked is a central value of a distance range, and the value of a predicted speed of the target object is a central value of a speed range. The detection accuracy controller 252 supplies a signal-processing control signal indicating the high-definition processing range to the signal processor 232.

Thereafter, the process returns to Step S101, and the processes of Steps S101 to S105 are repeatedly performed.

<Details of Object Detection Processing Performed on Basis of Captured Image>

Figure 4:
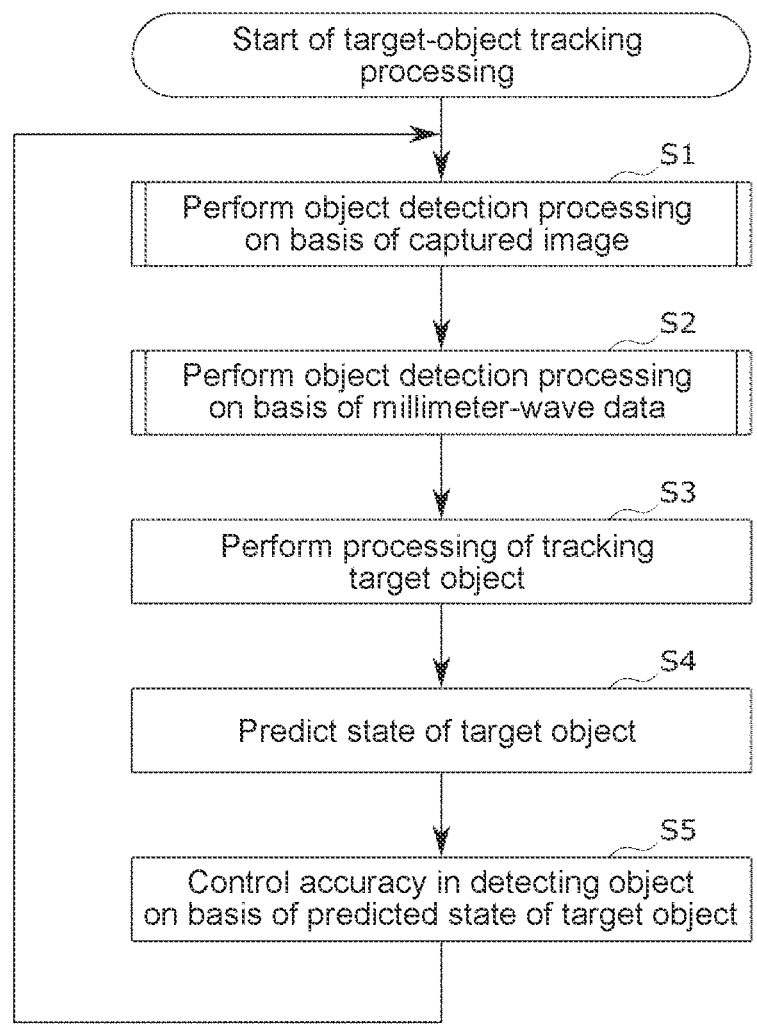
FIG. 4 is a flowchart for describing target-object tracking processing.
Figure 5:
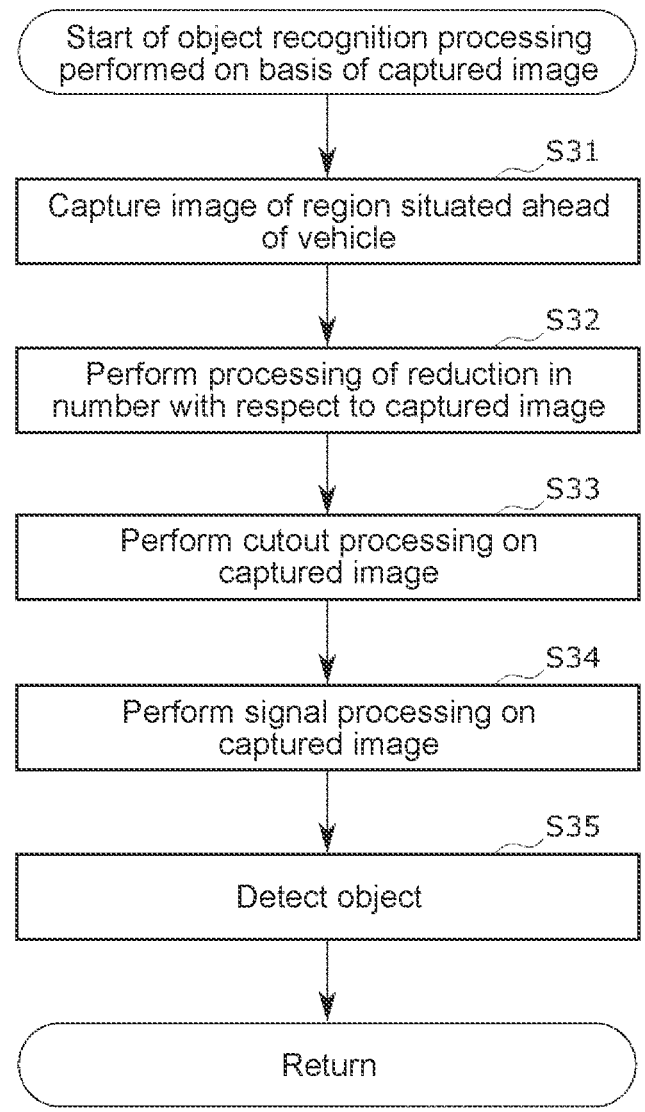
FIG. 5 is a flowchart for describing the details of object detection processing performed on the basis of a captured image.

Next, the object detection processing performed on the basis of a captured image in Step S1 of FIG. 4 is described in detail with reference to a flowchart of FIG. 5.

In Step S31, the camera 201 captures an image of a region situated ahead of the vehicle 10. Specifically, the image sensor 312 captures an image of a region situated ahead of the vehicle 10 through the lens 311, and stores the obtained captured image in the buffer 313.

In Step S32, the section 314 for reduction in number performs processing of reduction in number with respect to a captured image. Specifically, the section 314 for reduction in number reads a captured image of a latest frame from the buffer 313. The section 314 for reduction in number reduces the number of pixels to remove, for example, a pixel at a specified location in the captured image, in order to reduce the data size of the captured image. Through the output I/F section 317, the section 314 for reduction in number supplies the signal processor 231 with a low-resolution image obtained by performing the processing of reduction in number.

In Step S33, the cutout section 316 performs cutout processing on a captured image. Specifically, the cutout section 316 reads a captured image of a latest frame from the buffer 313. From the captured image, the cutout section 316 cuts out an image of a high-definition reading range to generate a crop image, the high-definition reading range being set by the detection accuracy controller 252 in the process of Step S5 performed in most recently performed target-object tracking processing. The cutout section 316 supplies the crop image to the signal processor 231 through the output I/F section 317.

In Step S34, the signal processor 231 performs signal processing on a captured image. Specifically, the signal processor 231 performs specified signal processing, such as RGB development processing, on the low-resolution captured image and the crop image. The signal processor 231 supplies the object detector 241 with the low-resolution captured image and the crop image on which the signal processing has been performed.

In Step S35, the object detector 241 detects an object. In other words, the object detector 241 performs processing of detecting an object in the low-resolution captured image and in the crop image.

When the processing of detecting an object in a low-resolution image is performed, a range wider than a crop image, or more specifically, an object in an entire image-capturing range (an angle of view) of the camera 201 is detected. However, a low-resolution image is inferior in detection accuracy since the resolution of a low-resolution image is lower than that of the crop image.

On the other hand, when the processing of detecting an object in a crop image is performed, the degree of accuracy in detecting an object becomes higher in a high-definition reading range than in a range other than the high-definition reading range, and this makes it possible to detect an object with a high degree of accuracy in the high-definition reading range. For example, an object having a small size, such as a distant vehicle, in an image is accurately detected.

The object detector 241 supplies the tracking processor 223 with data indicating a region, in the captured image (the low-resolution image and the crop image), in which there exits an object, and the type of the object.

Thereafter, the object detection processing performed on the basis of a captured image is terminated.

<Details of Object Detection Processing Performed on Basis of Millimeter-Wave Data>

Figure 6:
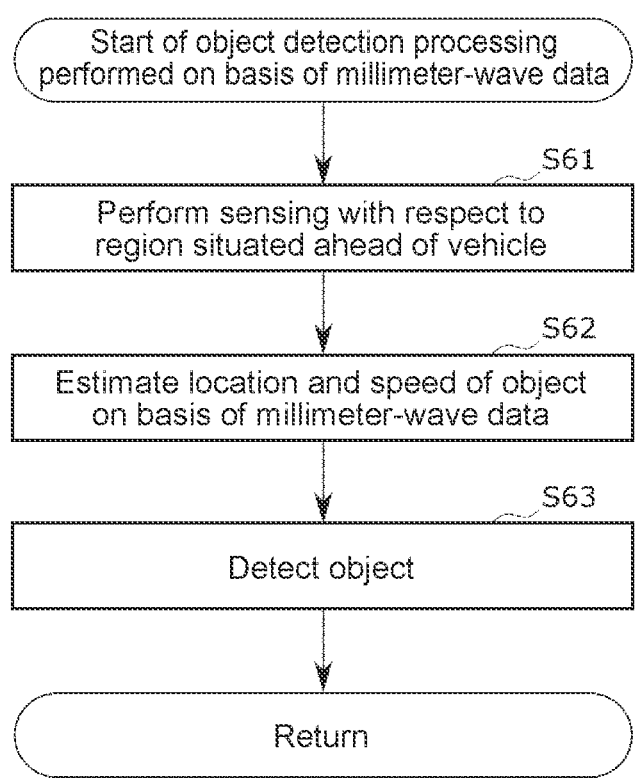
FIG. 6 is a flowchart for describing the details of object detection processing performed on the basis of millimeter-wave data.

Next, the object detection processing performed on the basis of millimeter-wave data in Step S2 of FIG. 4 is described in detail with reference to a flowchart of FIG. 6.

In Step S61, the millimeter-wave radar 202 performs sensing with respect to a region situated ahead of the vehicle 10. Specifically, the millimeter-wave radar 202 transmits a transmission signal in a forward direction of the vehicle 10, and receives, using a plurality of reception antennas, reception signals that are signals reflected off an object situated ahead of the vehicle 10. The millimeter-wave radar 202 supplies the signal processor 232 with millimeter-wave data that chronologically indicates the intensity of the reception signal received using each reception antenna.

In Step S62, the signal processor 232 estimates a location and a speed of an object on the basis of the millimeter-wave data. Specifically, the signal processor 232 performs specified signal processing on the millimeter-wave data obtained by each reception antenna to estimate a location and a speed of an object off which the transmission signal has been reflected. The location of the object is represented by, for example, a distance from the vehicle 10, and a direction (an angle) of the object with respect to an optical-axis direction of the millimeter-wave radar 202 (the traveling direction of the vehicle 10). The speed of the object is represented by, for example, a relative speed with respect to the vehicle 10.

Here, the distance to and the speed of the object can be estimated with a relatively small amount of computation, using, for example, the Fourier transform. On the other hand, the direction of the object, that is, the direction from which a reception signal comes is estimated using, for example, a Capon method, an Espri method, or deep learning, and its amount of computation is very large.

Thus, for example, first, the signal processor 232 estimates a distance to and a speed of an object situated ahead of the vehicle 10. Next, the signal processor 232 estimates a direction of the object situated ahead of the vehicle 10. Here, the signal processor 232 changes the accuracy in performing signal processing on the basis of the distance to and the speed of the object. Specifically, the signal processor 232 changes the accuracy in estimating the direction of the object on the basis of the distance to and the speed of the object. For example, with respect to a distance-and-speed range other than a high-definition processing range set in the process of Step S5 performed in most recently performed target-object tracking processing, the signal processor 232 makes an angular resolution (a resolvable number, bin) lower in the distance-and-speed range than in the high-definition processing range, and estimates the direction of the object.

This makes it possible to reduce an amount of computation. Further, in a high-definition processing range, that is, in a range in which a target object is predicted to exist, the angular resolution is set higher than in a range other than the high-definition processing range, and the direction of an object can be estimated with a high degree of accuracy.

The signal processor 232 generates a radar map indicating the distance to, the direction of, and the speed of each object situated ahead of the vehicle 10, as well as the intensity of a reception signal reflected off the object, and supplies the radar map to the object detector 242.

In Step S63, the object detector 242 detects an object. Specifically, the object detector 242 detects a location and a speed of each object situated ahead of the vehicle 10 on the basis of the radar map. the location of an object is represented by, for example, a distance from the vehicle 10 and a direction (an angle) with respect to the traveling direction (the front direction) of the vehicle 10. The speed of the object is represented by, for example, a relative speed with respect to the vehicle 10. The object detector 242 supplies the tracking processor 223 with data indicating a result of the detection of the location and the speed of each object.

Thereafter, the object detection processing performed on the basis of millimeter-wave data is terminated.

As described above, it is possible to track a target object with a high degree of accuracy by efficiently using limited resources of the vehicle control system 100.

For example, a result of an object detection performed by the camera 201 and a result of an object detection performed by the millimeter-wave radar 202 are fused to track a target object. This enables one of the camera 201 and the millimeter-wave radar 202 to make up for a state in which a detection condition for another of the camera 201 and the millimeter-wave radar 202 is not so good, and this results in an improvement in the tracking accuracy.

Further, when a low-resolution image and a crop image are generated by the camera 201 to be transmitted to the output side, an amount of data transmission is reduced, compared to when a captured image is transmitted to the output side with no change. For example, when the image sensor 312 is a 10-megapixel image sensor running at 30 fps, it is necessary that a transmission path such as the communication network 121 be a high-speed transmission path for transmission at 3.6 Gpbps or more, in order to transmit a captured image to the output side with no change. On the other hand, the transmission of a low-resolution image and a crop image from the camera 201 to the output side makes it possible to reduce a transfer rate of a transmission path.

Further, the use of a low-resolution image and a crop image instead of a captured image also makes it possible to reduce the processing capability of the signal processor 231 and the object detector 241. On the other hand, a target object (for example, a distant vehicle) detected with difficulty in a low-resolution image can be detected using a high-resolution crop image. Thus, it is also possible to track a target object with a high degree of accuracy when the resolution of a captured image is reduced.

Furthermore, the camera 201 of a higher definition than ever before can be mounted with respect to the transmission path of the same transfer rate, and the signal processor 231 and the object detector 241 each having the same processing capability. Consequently, for example, the use of a wide-angle lens for the lens 311 instead of separately providing a wide-angle camera and a telephoto camera makes it possible to cause the camera 201 alone to serve as both the wide-angle camera and the telephoto camera. This makes it possible to track a target object farther and more extensively using the camera 201 alone. This results in achieving, for example, a reduction in costs for the vehicle control system 100 and an improvement in layout and design.

2. Second Embodiment

Next, a second embodiment of the present technology is described with reference to FIG. 7.

<Second Embodiment of Data Acquisition Section 102 and Second Embodiment of Vehicle-Exterior-Information Detector 11>

Figure 7:
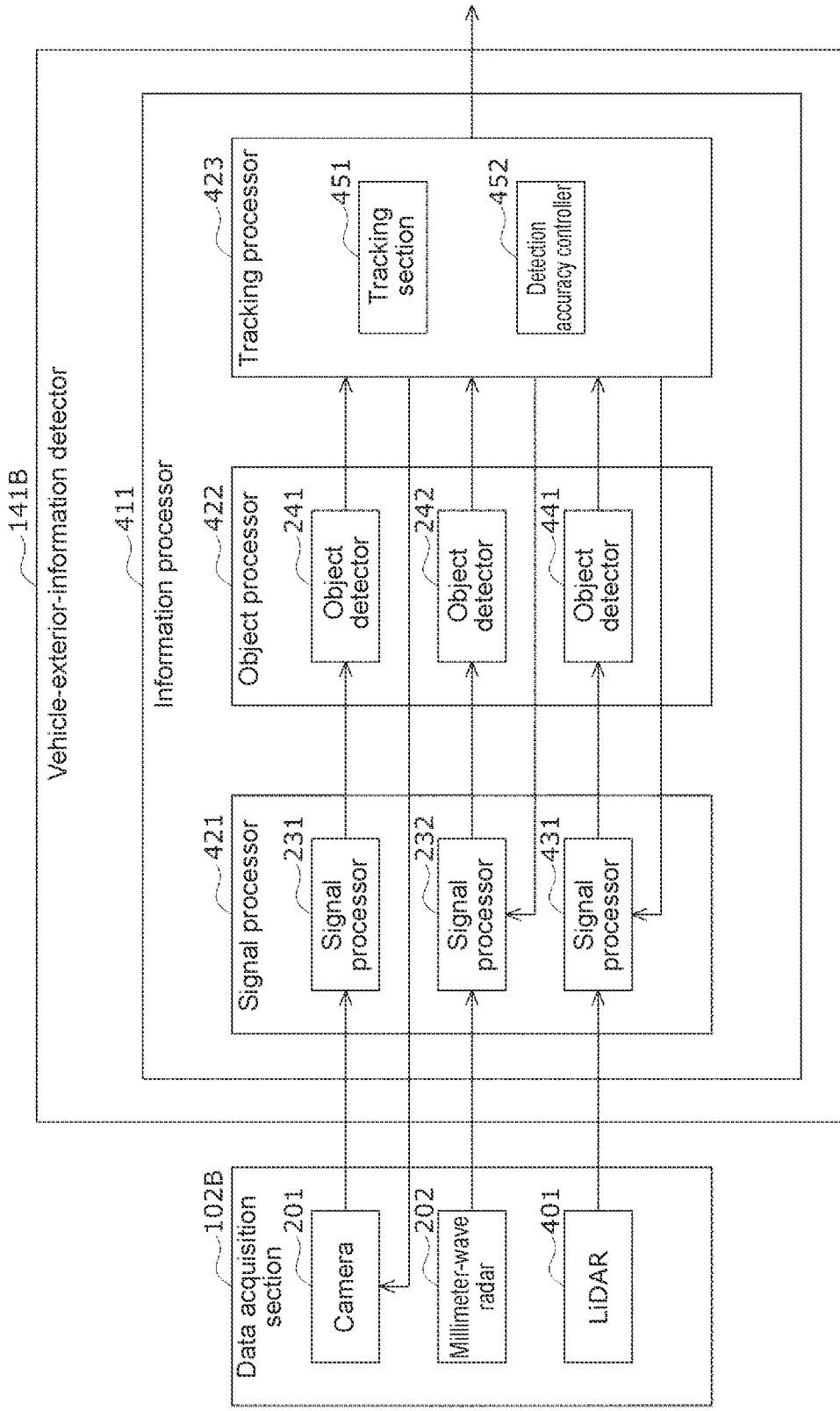
FIG. 7 is a block diagram illustrating a second embodiment of the data acquisition section and a second embodiment of the vehicle-exterior-information detector.

FIG. 7 illustrates portions of examples of configurations of a data acquisition section 102B that is a second embodiment of the data acquisition section 102 in the vehicle control system 100, and a vehicle-exterior-information detector 141B that is a second embodiment of the vehicle-exterior-information detector 141 in the vehicle control system 100. Note that a portion in the figure that corresponds to a portion in FIG. 2 is denoted by the same reference numeral as FIG. 2, and a description thereof is omitted as appropriate.

The data acquisition section 102B is similar to the data acquisition section 102A of FIG. 2 in including the camera 201 and the millimeter-wave radar 202, and is different from the data acquisition section 102A in including LiDAR 401.

The vehicle-exterior-information detector 141B includes an information processor 411. The information processor 411 includes a signal processor 421, an object detector 422, and a tracking processor 423. The signal processor 421 is similar to the signal processor 221 of FIG. 2 in including the signal processor 231 and the signal processor 232, and is different from the signal processor 221 in including a signal processor 431. The object detector 422 is similar to the object detector 222 of FIG. 2 in including the object detector 241 and the object detector 242, and is different from the object detector 222 in including an object detector 441. The tracking processor 423 includes a tracking section 451 and a detection accuracy controller 452.

The LiDAR 401 is, for example, a flash LiDAR. For example, the LiDAR 401 radially irradiates laser light (for example, infrared light) of a specified wavelength in two dimensions, in the lateral direction and the height direction, onto a region situated ahead of the vehicle 10, and receives reflected light of the laser light using a sensor that includes two-dimensionally arranged light-receiving elements. The LiDAR supplies the signal processor 431 with light-receiving data indicating the intensity of the reflected light received by each light-receiving element.

The signal processor 431 performs specified signal processing on the light-receiving data to generate three-dimensional group-of-points data (point cloud) indicating a shape and a location of an object situated ahead of the vehicle 10. The signal processor 431 supplies the group-of-points data to the object detector 441.

The object detector 441 performs processing of detecting an object situated ahead of the vehicle 10 on the basis of the group-of-points data. For example, the object detector 441 detects a location of (a distance to and a direction of) each object situated ahead of the vehicle 10 on the basis of the group-of-points data. The object detector 441 supplies the tracking processor 423 with data indicating a result of detecting the location of each object.

For example, as in the case of the tracking section 251, the tracking section 451 performs processing of tracking a target object situated ahead of the vehicle 10 using a filter, such as a Kalman filter or a particle filter, that is used to estimate and predict the state on the basis of an observation value. For example, the tracking section 451 estimates a current state of a target object situated ahead of the vehicle 10 on the basis of the result of the detection of an object that is performed by the object detector 241, the result of the detection of an object that is performed by the object detector 242, the result of the detection of an object that is performed by the object detector 441, and a result of predicting a state of the target object situated ahead of the vehicle 10. Further, the tracking section 251 predicts a future state of the target object situated ahead of the vehicle 10 on the basis of the result of the detection of an object that is performed by the object detector 241, the result of the detection of an object that is performed by the object detector 242, the result of the detection of an object that is performed by the object detector 441, and a result of the estimation of the current state of the target object situated ahead of the vehicle 10 that is performed by the tracking section 251.

The tracking section 451 supplies data indicating a result of estimating a state of a target object to, for example, the self-location estimator 132; the map analyzer 151, the traffic-rule recognition section 152, and the state recognition section 153 of the state analyzer 133; and the emergency event avoiding section 171 of the movement controller 135.

The detection accuracy controller 452 controls the accuracy in detecting an object on the basis of a result of predicting the state of the target object situated ahead of the vehicle 10. Specifically, as in the case of the detection accuracy controller 252 of FIG. 2, the detection accuracy controller 452 sets a high-definition reading range on the basis of a predicted location of the target object. The detection accuracy controller 452 generates a reading control signal indicating the high-definition reading range, and supplies the reading control signal to the camera 201. Further, as in the case of the detection accuracy controller 252, the detection accuracy controller 452 sets a first high-definition processing range on the basis of the predicted location and a predicted speed of the target object. The detection accuracy controller 452 generates a first signal-processing control signal indicating the first high-definition processing range, and supplies the first signal-processing control signal to the signal processor 232.

Further, the detection accuracy controller 452 sets a second high-definition processing range on the basis of the predicted location of the target object. For example, the detection accuracy controller 452 sets, to be the second high-definition processing range, a specified range centered at a predicted location of the target object, the predicted location being situated a distance not less than a specified distance away from the vehicle 10. The detection accuracy controller 452 generates a second signal-processing control signal indicating the second high-definition processing range, and supplies the second signal-processing control signal to the signal processor 431.

As described above, the addition of the LiDAR 401 makes it possible to track a target object with a higher degree of accuracy.

On the other hand, a large amount of computation is necessary to generate group-of-points data. In this regard, the signal processor 431 increases the accuracy of group-of-points data in a second high-definition processing range and reduces the accuracy of group-of-points data in a range other than the second high-definition processing range to reduce an amount of computation necessary to generate group-of-points data. Due to the increase in the accuracy of group-of-points data in a second high-definition processing range, a reduction in detecting a target object is suppressed even when there is a reduction in amount of computation.

<<<3. Modifications>>>

Modifications of the embodiments of the present technology described above are described below.

The example of tracking a target object situated ahead of the vehicle 10 has been described above. However, the present technology is also applicable to the case of tracking a target object situated in another direction, as viewed from the vehicle 10.

Further, the present technology is also applicable to the case of tracking a target object around a mobile object other than a vehicle. For example, it is conceivable that the present technology could be applied to a mobile object such as a motorcycle, a bicycle, personal mobility, an airplane, a ship, construction machinery, and agricultural machinery (a tractor). Further, examples of the mobile object to which the present technology is applicable also include a mobile object, such as a drone and a robot, that is remotely operated by a user without the user getting on the mobile object.

Furthermore, the present technology is also applicable to the case of tracking a target object at a fixed place such as a monitoring system.

Moreover, the present technology is applicable to the case of fusing a result of detection performed by the camera 201 (the image sensor 201A) and a result of detection performed by the LiDAR 401, or to the case of fusing a result of detection performed by the millimeter-wave radar 202 and the result of detection performed by the LiDAR 401.

Further, a flash LiDAR used as the LiDAR 401 may adopt a scheme of radially irradiating laser light in the lateral direction (the horizontal direction) and of performing scanning in the height direction.

Furthermore, instead of a flash LiDAR, a LiDAR that performs scanning with a laser pulse may be used as the LiDAR 401.

Moreover, the present technology is also appliable to the case of using a sensor that detects an object and is other than a millimeter-wave radar and LiDAR.

The example in which the camera 201 reduces the number of pixels to generate a low-resolution image has been described above. However, for example, the resolution of a captured image may be reduced by filtering processing or the like to generate a low-resolution image.

<<<4. Others>>>

<Example of Configuration of Computer>

The series of processes described above can be performed using hardware or software. When the series of processes is performed using software, a program included in the software is installed on a computer. Here, examples of the computer include a computer incorporated into dedicated hardware, and a computer such as a general-purpose personal computer that is capable of performing various functions by various programs being installed thereon.

Figure 8:
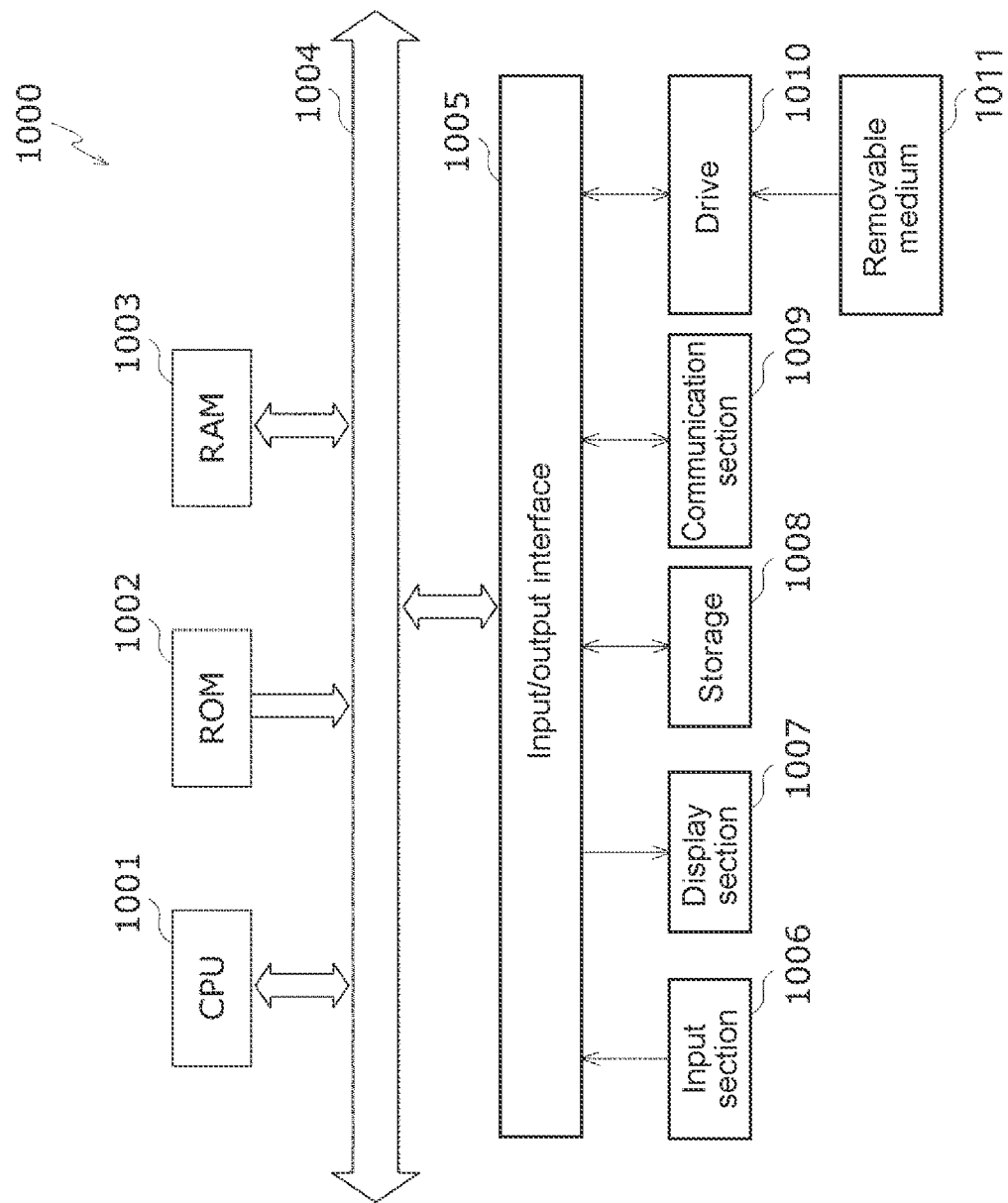
FIG. 8 illustrates an example of a configuration of a computer.

FIG. 8 is a block diagram of an example of a configuration of hardware of a computer that performs the series of processes described above using a program.

In the computer 1000, a central processing unit (CPU) 1001, a read only memory (ROM) 1002, and a random access memory (RAM) 1003 are connected to one another through a bus 1004.

Further, an input/output interface 1005 is connected to the bus 1004. An input section 1006, an output section 1007, a recording section 1008, a communication section 1009, and a drive 1010 are connected to the input/output interface 1005.

The input section 1006 includes, for example, an input switch, a button, a microphone, and an imaging element. The output section 1007 includes, for example, a display and a speaker. The recording section 1008 includes, for example, a hard disk and a nonvolatile memory. The communication section 1009 includes, for example, a network interface. The drive 1010 drives a removable medium 1011 such as a magnetic disk, an optical disk, a magneto-optical disk, or a semiconductor memory.

In the computer 1000 having the configuration described above, the series of processes described above is performed by the CPU 1001 loading, for example, a program recorded in the recording section 1008 into the RAM 1003 and executing the program via the input/output interface 1005 and the bus 1004.

For example, the program executed by the computer 1000 (the CPU 1001) can be provided by being recorded in the removable medium 1011 serving as, for example, a package medium. Further, the program can be provided via a wired or wireless transmission medium such as a local area network, the Internet, or digital satellite broadcasting.

In the computer 1000, the program can be installed on the recording section 1008 via the input/output interface 1005 by the removable medium 1011 being mounted on the drive 1010. Further, the program can be received by the communication section 1009 via the wired or wireless transmission medium to be installed on the recording section 1008. Moreover, the program can be installed in advance on the ROM 1002 or the recording section 1008.

Note that the program executed by the computer may be a program in which processes are chronologically performed in the order of the description herein, or may be a program in which processes are performed in parallel or a process is performed at a necessary timing such as a timing of calling.

Further, the system as used herein refers to a collection of a plurality of components (such as apparatuses and modules (parts)) and it does not matter whether all of the components are in a single housing. Thus, a plurality of apparatuses accommodated in separate housings and connected to one another via a network, and a single apparatus in which a plurality of modules is accommodated in a single housing are both systems.

Furthermore, the embodiment of the present technology is not limited to the examples described above, and various modifications may be made thereto without departing from the scope of the present technology.

For example, the present technology may also have a configuration of cloud computing in which a single function is shared to be cooperatively processed by a plurality of apparatuses via a network.

Further, the respective steps described using the flow-charts described above may be shared to be performed by a plurality of apparatuses, in addition to being performed by a single apparatus.

Moreover, when a single step includes a plurality of processes, the plurality of processes included in the single step may be shared to be performed by a plurality of apparatuses, in addition to being performed by a single apparatus.

<Example of Combination of Configurations>

The present technology may also take the following configurations.

(1) An information processing apparatus, including:
a first object detector that performs an object detection on the basis of first sensor data from a first sensor;
a second object detector that performs an object detection on the basis of second sensor data from a second sensor that differs in type from the first sensor;
a tracking section that predicts a state of a target object that is a tracking target, on the basis of a result of the object detection performed on the basis of the first sensor data, and on the basis of a result of the object detection performed on the basis of the second sensor data; and
a detection accuracy controller that sets a high-resolution range on the basis of the state of the target object that is predicted on the basis of the result of the object detection performed on the basis of the first sensor data, and on the basis of the result of the object detection performed on the basis of the second sensor data, the high-resolution range being a range in which an object detection is performed with a higher degree of accuracy than in a range other than the high-resolution range.

(2) The information processing apparatus according to (1), in which
one of the first sensor and the second sensor is a millimeter-wave radar, and
the information processing apparatus further includes a signal processor that performs signal processing on data output by the millimeter-wave radar, and makes a degree of accuracy in the signal processing higher in the high-resolution range than in the other range.

(3) The information processing apparatus according to (2), in which
the signal processor estimates a distance to an object, a speed of the object, and a direction of the object on the basis of the data output by the millimeter-wave radar, and makes a degree of accuracy in estimating the direction of the object higher in the high-resolution range than in the other range.

(4) The information processing apparatus according to (3), in which
the signal processor makes an angular resolution higher in the high-resolution range than in the other range to estimate the direction of the object.

(5) The information processing apparatus according to (3) or (4), in which
the high-resolution range is a distance-and-speed range in which the degree of accuracy in the estimation of the direction of the object that is performed by the signal processor, is made higher than in the other range.

(6) The information processing apparatus according to any one of (1) to (5), in which
one of the first sensor and the second sensor is an image sensor, and
the high-resolution range is a range, in an image output by a camera that includes the image sensor, in which resolution is made higher than in the other range.

(7) The information processing apparatus according to (6), in which
the detection accuracy controller sets the high-resolution range on the basis of a location of the target object that is predicted on the basis of the result of the object detection performed on the basis of the first sensor data, and on the basis of the result of the object detection performed on the basis of the second sensor data.

(8) The information processing apparatus according to (7), in which
the detection accuracy controller sets the high-resolution range on the basis of the predicted location of the target object, the predicted location of the target object being situated at a distance not less than a specified distance.

(9) The information processing apparatus according to any one of (6) to (8), in which
the camera outputs a second image and a third image, the second image being obtained by reducing resolution of a first image obtained by the image sensor, the third image being obtained by cutting out an image in the high-resolution range from the first image, and
one of the first object detector and the second object detector performs an object detection on the basis of the second image and the third image.

(10) The information processing apparatus according to any one of (1) to (9), in which
one of the first sensor and the second sensor is a flash LiDAR, and
the information processing apparatus further includes a signal processor that generates group-of-points data on the basis of data output by the flash LiDAR, and makes a degree of accuracy of group-of-points data higher in the high-resolution range than in the other range.

(11) The information processing apparatus according to (10), in which
the detection accuracy controller sets the high-resolution range on the basis of a location of the target object that is predicted on the basis of the result of the object detection performed on the basis of the first sensor data, and on the basis of the result of the object detection performed on the basis of the second sensor data.

(12) The information processing apparatus according to any one of (1) to (11), in which the first sensor and the second sensor are two of an image sensor, a millimeter-wave radar, and a flash LiDAR.

(13) The information processing apparatus according to any one of (1) to (12), in which
the tracking section estimates and predicts the state of the target object on the basis of the result of the object detection performed on the basis of the first sensor data, and on the basis of the result of the object detection performed on the basis of the second sensor data.

(14) The information processing apparatus according to (13), in which
the tracking section uses a Kalman filter or a particle filter.

(15) The information processing apparatus according to any one of (1) to (14), in which
the first object detector and the second object detector each perform the object detection with respect to surroundings of a mobile object, and
the tracking section predicts the state of the target object situated in the surroundings of the mobile object.

(16) An information processing method that is performed by an information processing apparatus, the information processing method including:
performing an object detection on the basis of first sensor data from a first sensor;
performing an object detection on the basis of second sensor data from a second sensor that differs in type from the first sensor;
predicting a state of a target object that is a tracking target, on the basis of a result of the object detection performed on the basis of the first sensor data, and on the basis of a result of the object detection performed on the basis of the second sensor data; and
setting a high-resolution range on the basis of the state of the target object that is predicted on the basis of the result of the object detection performed on the basis of the first sensor data, and on the basis of the result of the object detection performed on the basis of the second sensor data, the high-resolution range being a range in which an object detection is performed with a higher degree of accuracy than in a range other than the high-resolution range.

(17) A program for causing a computer to perform a process including:
performing an object detection on the basis of first sensor data from a first sensor;
performing an object detection on the basis of second sensor data from a second sensor that differs in type from the first sensor;
predicting a state of a target object that is a tracking target, on the basis of a result of the object detection performed on the basis of the first sensor data, and on the basis of a result of the object detection performed on the basis of the second sensor data; and
setting a high-resolution range on the basis of the state of the target object that is predicted on the basis of the result of the object detection performed on the basis of the first sensor data, and on the basis of the result of the object detection performed on the basis of the second sensor data, the high-resolution range being a range in which an object detection is performed with a higher degree of accuracy than in a range other than the high-resolution range.

(18) A mobile-object control apparatus, including:
a first object detector that performs an object detection with respect to surroundings of a mobile object on the basis of first sensor data from a first sensor;
a second object detector that performs an object detection with respect to the surroundings of the mobile object on the basis of second sensor data from a second sensor that differs in type from the first sensor;
a tracking section that estimates and predicts a state of a target object that is a tracking target, on the basis of a result of the object detection performed on the basis of the first sensor data, and on the basis of a result of the object detection performed on the basis of the second sensor data;
a detection accuracy controller that sets a high-resolution range on the basis of the state of the target object that is predicted on the basis of the result of the object detection performed on the basis of the first sensor data, and on the basis of the result of the object detection performed on the basis of the second sensor data, the high-resolution range being a range in which an object detection is performed with a higher degree of accuracy than in a range other than the high-resolution range; and
a movement controller that controls movement of the mobile object on the basis of the state of the target object that is estimated on the basis of the result of the object detection performed on the basis of the first sensor data, and on the basis of a result of the object detection performed on the basis of the second sensor data.

(19) A mobile object, including:
a first sensor;
a second sensor that differs in type from the first sensor;
a first object detector that performs an object detection on the basis of first sensor data from the first sensor;
a second object detector that performs an object detection on the basis of second sensor data from the second sensor;
a tracking section that estimates and predicts a state of a target object that is a tracking target, on the basis of a result of the object detection performed on the basis of the first sensor data, and on the basis of a result of the object detection performed on the basis of the second sensor data;
a detection accuracy controller that sets a high-resolution range on the basis of the state of the target object that is predicted on the basis of the result of the object detection performed on the basis of the first sensor data, and on the basis of the result of the object detection performed on the basis of the second sensor data, the high-resolution range being a range in which an object detection is performed with a higher degree of accuracy than in a range other than the high-resolution range; and
a movement controller that controls movement of the mobile object on the basis of the state of the target object that is estimated on the basis of the result of the object detection performed on the basis of the first sensor data, and on the basis of a result of the object detection performed on the basis of the second sensor data.

Note that the effects described herein are not limitative but are merely illustrative, and other effects may be provided.

REFERENCE SIGNS LIST 10 vehicle
100 vehicle control system 102, 102A, 102B data acquisition section
107 drivetrain controller
108 drivetrain system
135 movement controller
141, 141A, 141B vehicle-exterior-information detector
201 camera
202 millimeter-wave radar
211 information processor
221 signal processor
222 object detector
223 tracking processor
231, 232 signal processor
241, 242 object detector
251 tracking section
252 detection accuracy controller
312 image sensor
314 section for reduction in number
316 cutout section
401 LiDAR
411 information processor
421 signal processor
422 object detector
423 tracking processor
431 signal processor
441 object detector
451 tracking section
452 detection accuracy controller

The invention claimed is:

1. An information processing apparatus, comprising:
a first object detector configured to perform a first object detection based on first sensor data from a first sensor, wherein
the first sensor is an image sensor, and
the image sensor is in a camera;
a second object detector configured to perform a second object detection based on second sensor data from a second sensor, wherein
the second sensor differs in type from the first sensor;
a tracking section configured to predict a state of a target object that is a tracking target, based on a result of the first object detection and a result of the second object detection; and
a detection accuracy controller configured to set, based on the predicted state of the target object, a high-resolution range to control a degree of accuracy of each of the first object detection associated with the first sensor and the second object detection associated with the second sensor, wherein
the degree of accuracy is higher in the high-resolution range than in a range different from the high-resolution range,
the high-resolution range is a range in which resolution of an output image of the camera is higher than in a range different from the high-resolution range,
the image sensor obtains a first image,
the camera outputs a second image and a third image,
the second image is based on reduction in resolution of the first image,
the third image is based on cutting out, in the set high-resolution range, an image from the first image, and
the first object detector is further configured to perform, based on the second image and the third image, the first object detection.

2. The information processing apparatus according to claim 1, wherein
the second sensor is a millimeter-wave radar,
the information processing apparatus further comprises a signal processor configured to perform signal processing on output data of the millimeter-wave radar, and
in the signal processing, the degree of accuracy is higher in the high-resolution range than in a range different from the high-resolution range.

3. The information processing apparatus according to claim 2, wherein
the signal processor is further configured to estimate, based on the output data of the millimeter-wave radar, each of a distance to an object, a speed of the object, and a direction of the object, and
in the estimation of the direction of the object, the degree of accuracy is higher in the high-resolution range than in a range different from the high-resolution range.

4. The information processing apparatus according to claim 3, wherein
the signal processor is further configured to set an angular resolution that is higher in the high-resolution range than in a range different from the high-resolution range, to estimate the direction of the object.

5. The information processing apparatus according to claim 3, wherein
the high-resolution range is a distance-and-speed range in which the degree of accuracy in the estimation of the direction of the object is higher than in a range different from the high-resolution range.

6. The information processing apparatus according to claim 1, wherein
the tracking section is further configured to predict a location of the target object based on the result of the first object detection and the result of the second object detection, and
the detection accuracy controller is further configured to set the high-resolution range based on the predicted location of the target object.

7. The information processing apparatus according to claim 6, wherein
the detection accuracy controller is further configured to set the high-resolution range based on the predicted location of the target object, and
the predicted location of the target object is at a distance not less than a specific distance.

8. The information processing apparatus according to claim 1, wherein
the second sensor is a flash LiDAR,
the information processing apparatus further comprises a signal processor that is configured to generate group-of-points data based on output data of the flash LiDAR, and
the degree of accuracy of group-of-points data is higher in the high-resolution range than in a range different from the high-resolution range.

9. The information processing apparatus according to claim 8, wherein
the tracking section is further configured to predict a location of the target object based on the result of the first object detection and the result of the second object detection, and
the detection accuracy controller is further configured to set the high-resolution range based on the predicted location of the target object.

10. The information processing apparatus according to claim 1, wherein
the second sensor is one of a millimeter-wave radar or a flash LiDAR.

11. The information processing apparatus according to claim 1, wherein
the tracking section is further configured to estimate and predict the state of the target object based on the result of the first object detection and the result of the second object detection.

12. The information processing apparatus according to claim 11, wherein the tracking section uses a Kalman filter or a particle filter.

13. The information processing apparatus according to claim 1, wherein
each of the first object detector and the second object detector is further configured to perform the first object detection and the second object detection with respect to surroundings of a mobile object, and
the tracking section is further configured to predict the state of the target object in the surroundings of the mobile object.

14. An information processing method, comprising:
in an information processing apparatus:
performing a first object detection based on first sensor data from a first sensor, wherein
the first sensor is an image sensor, and
the image sensor is in a camera;
performing a second object detection based on second sensor data from a second sensor, wherein the second sensor differs in type from the first sensor;
predicting a state of a target object that is a tracking target, based on a result of the first object detection and a result of the second object detection;
setting, based on the predicted state of the target object, a high-resolution range to control a degree of accuracy of each of the first object detection associated with the first sensor and the second object detection associated with the second sensor, wherein
degree of accuracy is higher in the high-resolution range than in a range different from the high-resolution range,
the high-resolution range is a range in which resolution of an output image of the camera is higher than in a range different from the high-resolution range,
the image sensor obtains a first image,
the camera outputs a second image and a third image,
the second image is based on reduction in resolution of the first image, and
the third image is based on cutting out, in the set high-resolution range, an image from the first image; and
performing the first object detection based on the second image and the third image.

15. A non-transitory computer-readable medium having stored thereon, computer-executable instructions which, when executed by a computer, cause the computer to execute operations, the operations comprising:
performing a first object detection based on first sensor data from a first sensor, wherein
the first sensor is an image sensor, and
the image sensor is in a camera;
performing a second object detection based on second sensor data from a second sensor, wherein the second sensor differs in type from the first sensor;
predicting a state of a target object that is a tracking target, based on a result of the first object detection and a result of the second object detection;
setting, based on the predicted state of the target object, a high-resolution range to control a degree of accuracy of each of the first object detection associated with the first sensor and the second object detection associated with the second sensor, wherein
degree of accuracy is higher in the high-resolution range than in a range different from the high-resolution range,
the high-resolution range is a range in which resolution of an output image of the camera is higher than in a range different from the high-resolution range,
the image sensor obtains a first image,
the camera outputs a second image and a third image,
the second image is based on reduction in resolution of the first image, and
the third image is based on cutting out, in the set high-resolution range, an image from the first image; and
performing the first object detection based on the second image and the third image.

16. A mobile-object control apparatus, comprising:
a first object detector configured to perform, based on first sensor data from a first sensor, a first object detection with respect to surroundings of a mobile object, wherein
the first sensor is an image sensor, and
the image sensor is in a camera;
a second object detector configured to perform, based on second sensor data from a second sensor, a second object detection with respect to the surroundings of the mobile object, wherein the second sensor differs in type from the first sensor;
a tracking section configured to estimate and predict a state of a target object that is a tracking target, based on a result of the first object detection and a result of the second object detection;
a detection accuracy controller configured to set, based on the predicted state of the target object, a high-resolution range to control a degree of accuracy of each of the first object detection associated with the first sensor and the second object detection associated with the second sensor, wherein
the degree of accuracy is higher in the high-resolution range than in a range different from the high-resolution range,
the high-resolution range is a range in which resolution of an output image of the camera is higher than in a range different from the high-resolution range,
the image sensor obtains a first image,
the camera outputs a second image and a third image,
the second image is based on reduction in resolution of the first image,
the third image is based on cutting out, in the set high-resolution range, an image from the first image, and
the first object detector is further configured to perform, based on the second image and the third image, the first object detection; and
a movement controller configured to control movement of the mobile object based on the estimated state of the target object.

17. A mobile object, comprising:
a first sensor that is an image sensor, wherein the image sensor is in a camera;
a second sensor that differs in type from the first sensor;
a first object detector configured to perform a first object detection based on first sensor data from the first sensor;

a second object detector configured to perform a second object detection based on second sensor data from the second sensor;

a tracking section configured to estimate and predict a state of a target object that is a tracking target, based on a result of the first object detection and a result of the second object detection;

a detection accuracy controller configured to set, based on the predicted state of the target object, a high-resolution range to control a degree of accuracy of each of the first object detection associated with the first sensor and the second object detection associated with the second sensor, wherein the degree of accuracy is higher in the high-resolution range than in a range different from the high-resolution range, the high-resolution range is a range in which resolution of an output image of the camera is higher than in a range different from the high-resolution range, the image sensor is configured to obtain a first image, the camera is configured to output a second image and a third image, the second image is based on reduction in resolution of the first image, the third image is based on cutting out, in the set high-resolution range, an image from the first image, and the first object detector is further configured to perform, based on the second image and the third image, the first object detection; and a movement controller configured to control movement of the mobile object based on the estimated state of the target object.

* * * * *